United States Patent
Dai

(10) Patent No.: US 9,851,084 B2
(45) Date of Patent: Dec. 26, 2017

(54) MULTIFUNCTIONAL LED INDUCTION LAMP

(71) Applicant: Ningbo Weitao Electrical Appliance Co., Ltd., Ningbo, Zhejiang (CN)

(72) Inventor: Jiangang Dai, Zhejiang (CN)

(73) Assignee: Ningbo Weitao Electrical Appliance Co., Ltd., Ningbo (CN)

( * ) Notice: Subject to any disclaimer, the term of this patent is extended or adjusted under 35 U.S.C. 154(b) by 184 days.

(21) Appl. No.: 14/931,851

(22) Filed: Nov. 4, 2015

(65) Prior Publication Data
US 2017/0122539 A1 May 4, 2017

(51) Int. Cl.
| F21V 23/06 | (2006.01) |
| F21V 8/00 | (2006.01) |
| F21S 9/02 | (2006.01) |
| F21V 5/04 | (2006.01) |
| F21Y 115/10 | (2016.01) |

(52) U.S. Cl.
CPC ................ *F21V 23/06* (2013.01); *F21S 9/02* (2013.01); *F21V 5/04* (2013.01); *G02B 6/0021* (2013.01); *F21Y 2115/10* (2016.08)

(58) Field of Classification Search
CPC .. F21V 23/0442; F21V 23/0471; F21V 23/06; F21V 2200/20; F21V 21/002; F21S 9/02–9/024; F21S 8/035; H02J 9/065; F21L 4/08; F21L 4/085; G02B 6/0021
See application file for complete search history.

(56) References Cited

U.S. PATENT DOCUMENTS

| D633,237 S   | *  | 2/2011  | Wang   | ............................ D26/26 |
| 8,901,827 B1 | *  | 12/2014 | Xu     | ........................... F21S 9/037 |
|              |    |         |        | 315/153 |
| 2005/0099799 A1 | * | 5/2005 | Cugini | .................... F21L 14/00 |
|              |    |         |        | 362/105 |
| 2009/0154148 A1 | * | 6/2009 | Meyer  | ....................... F21L 2/00 |
|              |    |         |        | 362/157 |
| 2010/0066250 A1 | * | 3/2010 | Wallach | .................... H02J 9/02 |
|              |    |         |        | 315/86 |
| 2010/0302758 A1 | * | 12/2010 | Wang  | ..................... F21S 9/022 |
|              |    |         |        | 362/20 |
| 2013/0215603 A1 | * | 8/2013 | Chien  | ....................... F21L 4/08 |
|              |    |         |        | 362/183 |
| 2013/0236192 A1 | * | 9/2013 | Deicke | .................. G06F 1/1632 |
|              |    |         |        | 398/135 |
| 2014/0275884 A1 | * | 9/2014 | Lin    | .................... A61B 5/14552 |
|              |    |         |        | 600/324 |

* cited by examiner

*Primary Examiner* — Anh Mai
*Assistant Examiner* — Steven Horikoshi

(57) ABSTRACT

This invention discloses a multifunctional LED induction lamp including a flat recharge stand standing against a power outlet via plug pieces and a flat lamp body fixed to the recharge stand. An LED lamp is disposed between the shell body and a face-plate of the lamp body, a induction probe is disposed on a PCB circuit board, the upper end-face of the shell body is covered by a lens, light transmitting holes where light induction elements are located are at two sides of the LED lamp, a lens hood is disposed between the light induction element and the shell body, a rechargeable battery is disposed in the shell body, and a button switch and a snap switch are disposed at the side-face of the shell body. Thus, multiple illuminating modes and control modes may be realized via the elements, and the structure and functions of the lamp are humanized.

4 Claims, 3 Drawing Sheets

MULTIFUNCTIONAL LED INDUCTION LAMP

BACKGROUND OF THE INVENTION

Field of the Invention

The invention relates to intelligent illumination field and, more particularly, to a multifunctional LED induction lamp.

Description of the Related Art

An induction lamp is actually an automatic-control switch circuit, with a plurality of types. The type of a control switch includes a voice-operated switch, a trigger switch, an induction switch, and a light-operated switch. The switch-on way is basically the same with the switch-off way that is controlled by a built-in delay switch.

An infrared induction lamp is a new-generation intelligent illuminating lamp that detects a light environment state by sensing human body's infrared thermal radiation and is turned on or turned off via the built-in delay switch, and the lamp is also called human infrared induction lamp. The infrared induction lamp includes the following built-in modules: an infrared sensing module and a delay switch module. If somebody enters into an induction range of the lamp and moves in the range, the infrared sensing module is triggered and detects signals, and the delay switch module is triggered to turn on the infrared induction lamp by the signals. If somebody continually moves in the range, the infrared induction lamp is constantly lighted, and when the body leaves the range and there are no infrared sensing signals, the delay switch automatically turns off the infrared induction lamp in set time. Each module returns to a standby state and waits for the next period.

The conventional infrared induction lamps are generally used at corridors, elevators, bathrooms, and storerooms, to realize safety and energy conservation via automatic switch and to show humanized care. However, as the infrared induction lamp is usually used in the above space, the function of the infrared induction lamp still stays at the most basic function that is "when body comes, turn on; when body leaves, turn off". Thus, in the market, the ordinary induction lamp with the single function is not suitable for being used in the home environment and fails to satisfy requirements of people for household illumination. Therefore, a multifunctional LED induction lamp with a humanized design, capable of satisfying multiple illuminating functions needed by people in daily life, is designed.

BRIEF SUMMARY OF THE INVENTION

The invention provides a multifunctional LED induction lamp with multiple functions, a unique appearance, and a humanized design, to improve the prior art.

To solve the above problem, this invention provides a multifunctional LED induction lamp including a recharge stand and a lamp body. The recharge stand and the lamp body are flat structures, respectively, plug pieces are disposed at the back of the recharge stand, the recharge stand stands against a power outlet via the plug pieces, the lamp body is uprightly fixed to the recharge stand, a first magnetic ring sleeved by a charging coil is disposed in the recharge stand, the lamp body includes a shell body, a second magnetic ring corresponding to the first magnetic ring is disposed in the shell body, the second magnetic ring is sleeved by a lamp body coil, a face-plate covers the outer side-face of the shell body, an LED lamp belt bent to a circle is disposed between the shell body and the face-plate, a PCB circuit board is disposed in the shell body, an induction probe is disposed on the PCB circuit board, the induction probe extends out the face-plate from the middle of the LED lamp belt, the shell body has a notch at the upper end-face, the notch is covered by a lens, an LED lamp is disposed below the lens, the LED lamp is connected with the lens via a light bowl, light transmitting holes are located at two sides of the LED lamp, light induction elements are located at the light transmitting holes, a lens hood is disposed between the light induction element and the shell body, a rechargeable battery is disposed in the shell body, the light induction element, the rechargeable battery, the LED lamp belt, the LED lamp, and the lamp body coil are connected with the PCB circuit board, and a button switch connected the PCB circuit board for controlling the LED lamp and a snap switch connected the PCB circuit board for controlling the LED lamp belt are disposed at the side-face of the shell body.

The shell body may include a face-piece and a face-cover, the face-piece and the face-cover may form a hollow space, a bottom-stand for fixing the induction probe may be disposed on the PCB circuit board, a hemispherical lens may be disposed on the bottom-stand, a locating ring may be sleeved on the bottom-stand, the face-cover and the face-plate may have a through hole, respectively, the lens may protrude through the face-cover and face-plate, a locating sleeve may be disposed at the face-plate, the locating sleeve may surround the lens, one end of the locating sleeve may pass through the face-plate and the face-cover to connect with screw threads of a locating ring. The induction probe may be disposed at the surface of the face-cover, thus to be capable of achieving better induction of the human body via the hemispherical lens and to protect the sensitivity. The disposition of the locating ring, the bottom-stand, and the locating sleeve is used for fixing the induction probe better.

The recharge stand may include a bottom-cover and a face-piece, the plug pieces may be disposed on the bottom-cover, the face-piece may have a peripheral edge, the edge may coat the periphery of the lamp body, a fastener may be disposed at the edge, the lamp body may be connected with the recharge stand via the fastener, an iron block may be fixed in the face-piece of the shell body via 3M glue, and a magnet may be fixed to the face-piece of the recharge stand. The face-piece may have the edge at the periphery, and the fastener at the edge may fix the lamp body to the recharge stand. In addition, the iron block may be disposed in the lamp body, the magnet may be disposed at the recharge stand, and the lamp body can be further attached to the recharge stand via the iron block and the magnet, thus to ensure installation.

The face-piece may have a kidney groove and a circular hole at the side-face, the snap switch may be disposed on the PCB circuit board and pass through the kidney groove, the snap switch may be sleeved by a limiting part, a kidney part connected with the snap switch may be disposed at the kidney groove, the kidney part may move upwards and downwards in the kidney groove to turn on or off the snap switch, a switch sleeve may be disposed at the circular hole, and the switch sleeve may be connected with the button switch. The snap switch and the button switch can facilitate users to control the lamp in the invention, convenient for use.

A circular holder may be disposed on the surface of the face-cover, and the LED lamp belt may wind around the circular holder. The lamp belt is flexible and can mold a plurality of shapes. The lamp belt is fixed via the circular holder and may be fixed to be a circle.

Compared with the prior art, the advantage of the invention is that the recharge stand and the lamp body are flat structures, and the recharge stand and the lamp body are uprightly attached to the power outlet, that is against the wall. Therefore, the flat structures satisfy the working environment of the lamp, and after the lamp is fixed, the lamp is not lofty. There are no wires for connecting the recharge stand and the lamp body, while the first magnetic ring, the charging coil, the second magnetic ring, and the lamp body coil are used for wireless recharge. Therefore, the lamp body can be directly detached from the recharge stand at any time, and can be used as an ordinary torch powered by the rechargeable battery. In the invention, there are the LED lamp belt bent to a circle and the LED lamp disposed at the top of the lamp body. The LED lamp belt can illuminate the whole face-plate, and the LED lamp can emit light from the top of the lamp body for illumination. There are the induction probe, the light induction element, the PCB circuit board, the button switch, and the snap switch. Therefore, in this invention, the light induction and infrared induction can control the operation of the lamp body at the same time. The lamp body can distinguish the light strength of the environment via the light induction element, thus to control to turn on or off the lamp body and to control the lighting power of the working state; the induction probe can determine if somebody enters into the monitoring range, thus to control the working state of the lamp body. The button switch and the snap switch are provided for the users to operate the lamp body. Therefore, in the invention, a plurality of illuminating modes and control modes may be realized via the above elements, the lamp has multiple functions, and the structure and function of the lamp are humanized.

DETAILED DESCRIPTION OF THE INVENTION

This invention is further described in detail with regard to the accompanying drawings.

Figure 1:
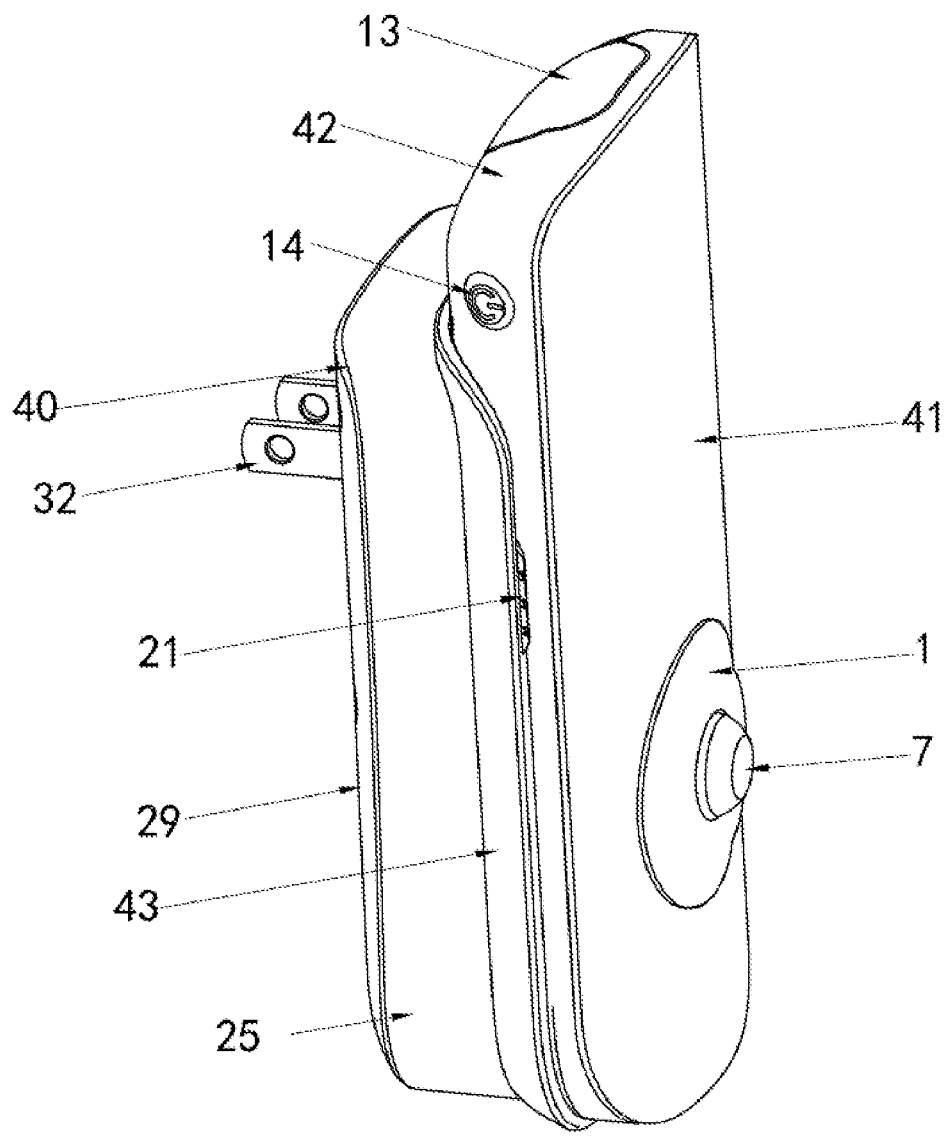
FIG. 1 is a structure schematic diagram of the invention.
Figure 2:
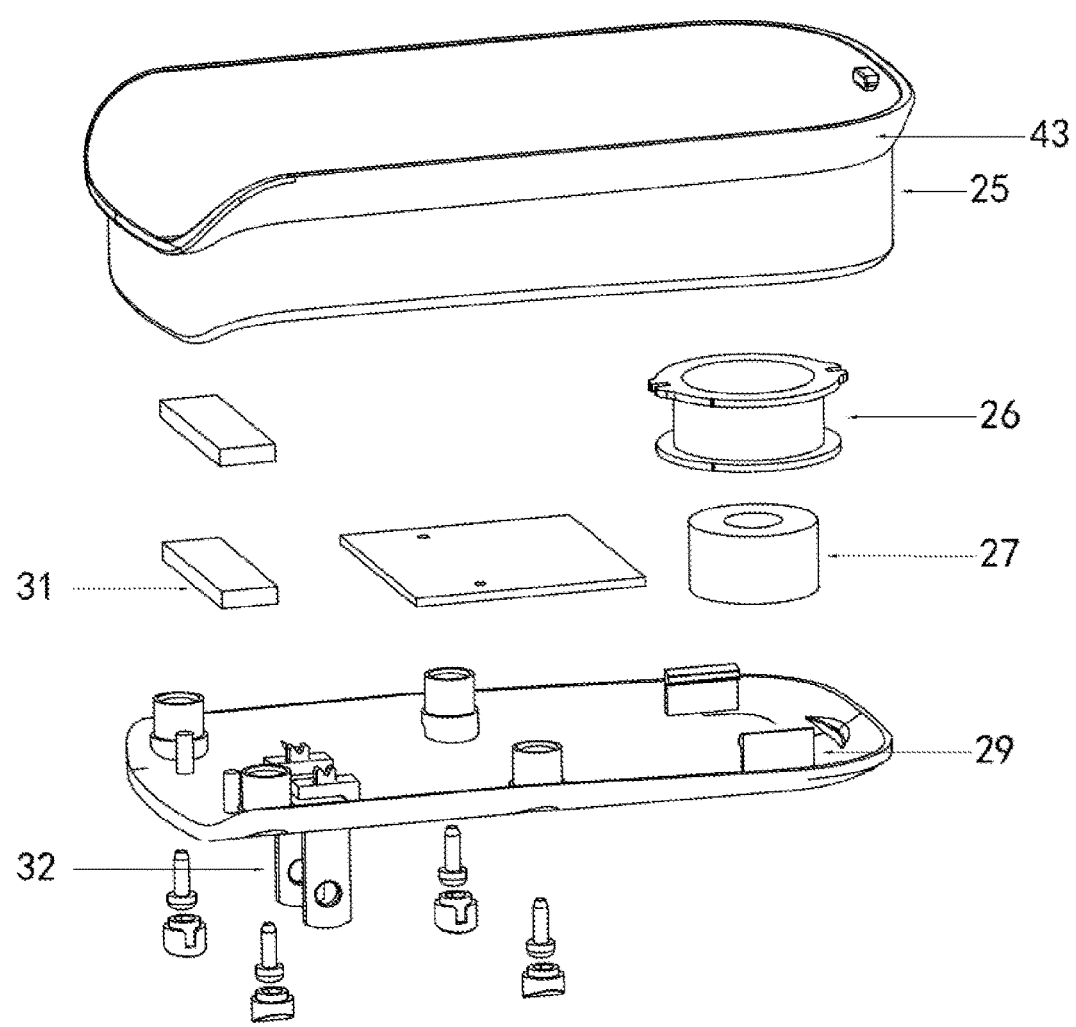
FIG. 2 is an exploded diagram of a recharge stand.
Figure 3:
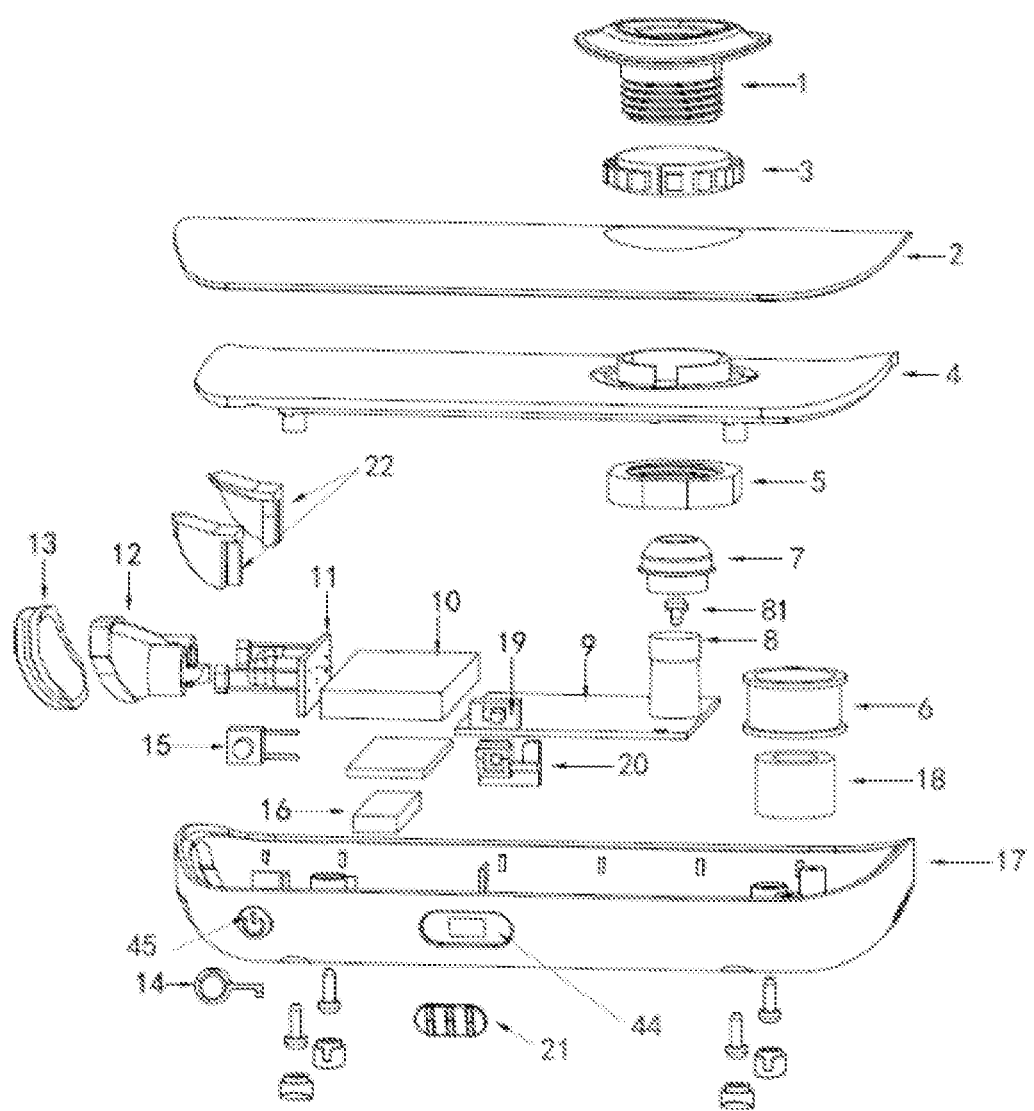
FIG. 3 is an exploded diagram of a lamp body.

In FIG. 1 to FIG. 3, a multifunctional LED induction lamp includes a recharge stand 40 and a lamp body 41, the recharge stand 40 and the lamp body 41 are flat structures, plug pieces 32 are disposed at the back of the recharge stand 40, the recharge stand 40 stands against a power outlet via the plug pieces 32, the lamp body 41 is uprightly fixed to the recharge stand 40, a first magnetic ring 27 sleeved by a charging coil 26 is disposed in the recharge stand 40, the lamp body 41 includes a shell body 42, a second magnetic ring 18 corresponding to the first magnetic ring 27 is disposed in the shell body 42, the second magnetic ring 18 is sleeved by a lamp body coil 6, a face-plate 2 covers the outer side-face of the shell body 42, an LED lamp belt 3 bent to a circle is disposed between the shell body 42 and the face-plate 2, a PCB circuit board 9 is disposed in the shell body 42, an induction probe 81 is disposed on the PCB circuit board 9, the induction probe 81 extends out the face-plate 2 from the middle of the LED lamp belt 3, the shell body 42 has a notch at the upper end-face, the notch is covered by a lens 13, an LED lamp 11 is disposed below the lens 13, the LED lamp 11 is connected with the lens 13 via a light bowl 12, light transmitting holes are disposed at two sides of the LED lamp 11, light induction elements are located at the light transmitting holes, a lens hood 22 is disposed between the light induction element and the shell body 42, a rechargeable battery 10 is disposed in the shell body 42, the light induction element, the rechargeable battery 10, the LED lamp belt 3, the LED lamp 11, and the lamp body coil 6 are connected with the PCB circuit board 9, a button switch 15 connected with the PCB circuit board 9 for controlling the LED lamp 11 and a snap switch 19 connected with the PCB circuit board 9 for controlling the LED lamp belt 3 are disposed at the side-face of the shell body 42.

The shell body 42 includes a face-piece 17 and a face-cover 4, the face-piece 17 and the face-cover 4 form a hollow space, a bottom-stand 8 for fixing the induction probe 81 is disposed on the PCB circuit board 9, a hemispherical lens 7 is disposed on the bottom-stand 8, a locating ring 5 is sleeved on the bottom-stand 8, the face-cover 4 and the face-plate 2 have a through hole, respectively, the lens 7 protrudes through the face-cover 4 and face-plate 2, a locating sleeve 1 is disposed at the face-plate 2, the locating sleeve 1 surrounds the lens 7, one end of the locating sleeve 1 passes through the face-plate 2 and the face-cover 4 to connect with screw threads of the locating ring 5.

The recharge stand 40 includes a bottom-cover 29 and a face-piece 25, the plug pieces 32 are disposed on the bottom-cover 29, the face-piece 25 has an edge 43 at the peripheral, the edge 43 coats the periphery of the lamp body 41, a fastener is disposed at the edge 43, the lamp body 41 is connected with the recharge stand 40 via the fastener, an iron block 16 is fixed in the face-piece 17 via 3M glue, and a magnet 31 is fixed to the face-piece 25.

The face-piece 17 has a kidney groove 44 and a circular hole 45 at the side-face, the snap switch 19 is disposed on the PCB circuit board 9 and passes through the kidney groove 44, the snap switch 19 is sleeved by a limiting part 20, a kidney part 21 connected with the snap switch 19 is disposed at the kidney groove 44, the kidney part 21 moves upwards and downwards in the kidney groove 44 to turn on or off the snap switch 19, a switch sleeve 14 is disposed at the circular hole 45, and the switch sleeve 14 is connected with the button switch 15. A circular holder is disposed on the surface of the face-cover 4, and the LED lamp belt 3 winds around the circular holder.

When the lamp is used, the plug pieces 32 of the recharge stand 40 are inserted into the power outlet on the wall, and the flat recharge stand 40 stands against the wall via the insertion of the plug pieces 32. The flat lamp body 41 is uprightly fixed to the recharge stand 40. Thus, the whole lamp can be attached to the wall, which is eye-pleasing and graceful. The charging coil 26 and the first magnetic ring 27 are disposed in the recharge stand 40, the second magnetic ring 18, and the lamp body coil 6, and the rechargeable battery 10 are disposed in the shell body 42. When the lamp body 41 is fixed to the recharge stand 40, the rechargeable battery 10 in the lamp body 41 can be wirelessly charged via the recharge stand 40. When the lamp body 41 is detached from the recharge stand 40, the interior rechargeable battery 10 powers the lamp body 41.

The LED lamp belt 3 is disposed between the shell body 42 and the face-plate 2, and the LED lamp belt 3 may emit the light with a plurality of colors in kinds of modes. In the invention, the LED lamp belt 3 surrounds the induction probe 81, and is bent to a circle, thus to illuminate the whole face-plate 2. The induction probe 81 is used for infrared induction, when the human body enters into the induction range of the lamp body 41, the induction probe 81 is triggered and detects signals, the signals trigger a delay switch, and the LED lamp belt 3 is turned on. After certain delay time, the LED lamp belt 3 is automatically turned off or the LED lamp belt 3 enters into an energy saving mode.

The button switch 15 controls the LED lamp 11. The lamp body 41 may be used as an ordinary torch after detached from the recharge stand 40. The light transmitting holes are located at two sides of the LED lamp 11, the light induction elements are located at the light transmitting holes, the external environment light can directly pass the lens 13 into the light transmitting holes, and the light induction elements can sense the light. Different from the ordinary light induction lamp on which a hole is necessary at the outer surface to allow the light in, in the invention, the area of the lens 13 of the LED lamp 11 is directly used for allowing the light into to realize light induction. The lens hood 22 is disposed between the light induction element and the shell body 42, to prevent the LED lamp belt 3 from interfering with the light induction element.

The lamp body 41 can be used as a torch after detached from the recharge stand 40. The button switch 15 is pressed in sequence, to turn on the LED lamp belt 3, to turn on the LED lamp 11, to turn off the LED lamp belt 3, and to turn off the LED lamp 11.

When the lamp body 41 is fixed to the recharge stand 40 and the recharge stand 40 is plugged into the corresponding power outlet, it may be as a thermal infrared human induction lamp when the power is on. When the snap switch 19 is at the OFF mode, as there is somebody in the induction area, the LED lamp belt 3 is lighted and turned off after certain delay time, at that moment, the button switch 15 can turn off the induction function. To realize the light induction function of the energy-saving product, the induction lamp is invalid under certain light, and only can be used in dark environment. When the snap switch 19 is at the ON mode, the night-light function is turned on. In the dark environment, the LED lamp belt 3 is always on with tiny light, when somebody moves in the induction area, the LED lamp belt 3 is on with full light, and after certain delay time, the LED lamp belt 3 returns to be on with tiny light.

When the lamp body 41 is fixed to the recharge stand 40, if the power is off, the LED lamp belt 3 can be automatically turned on, and at that moment, the button switch 15 is pressed to turn on the LED lamp 11 or to turn off the LED lamp 11.

The lamp body 41 is charged in a wireless mode. As long as the lamp body 41 is fixed to the recharge stand 40 and the recharge stand 40 is plugged into the corresponding power outlet, the lamp body 41 can be automatically charged when the power is not off. There is excellent charging management and protection in the interior of the lamp body 4. After the rechargeable battery 10 is fully charged, the charging function is automatically turned off, and the people are not necessary to detach the product.

What is claimed is:

1. A multifunctional LED induction lamp comprising a recharge stand and a lamp body, wherein the recharge stand and the lamp body are flat structures, plug pieces are disposed at the back of the recharge stand, the recharge stand stands against a power outlet via the plug pieces, the lamp body is uprightly fixed to the recharge stand, a first magnetic ring sleeved by a charging coil is disposed in the recharge stand, the lamp body includes a shell body, a second magnetic ring corresponding to the first magnetic ring is disposed in the shell body, the second magnetic ring is sleeved by a lamp body coil, a face-plate covers the outer side-face of the shell body, an LED lamp belt bent to a circle is disposed between the shell body and the face-plate, a PCB circuit board is disposed in the shell body, a induction probe is disposed on the PCB circuit board, the induction probe extends out the face-plate from the middle of the LED lamp belt, the shell body has a notch at the upper end-face, the notch is covered by a lens, an LED lamp is disposed below the lens, the LED lamp is connected with the lens via a light bowl, light transmitting holes are located at two sides of the LED lamp, light induction elements are located at the light transmitting holes, a respective lens hood is disposed between each of the respective light induction elements and the shell body, a rechargeable battery is disposed in the shell body, the light induction element, the rechargeable battery, the LED lamp belt, the LED lamp, and the lamp body coil are connected with the PCB circuit board, and a button switch connected the PCB circuit board for controlling the LED lamp and a snap switch connected the PCB circuit board for controlling the LED lamp belt are disposed at the side-face of the shell body;

wherein a circular holder is disposed on the surface of the face-cover of the shell body, and the LED lamp belt winds around the circular holder.

2. The multifunctional LED induction lamp according to claim 1, wherein the shell body comprises a face-piece and a face-cover, the face-piece and the face-cover form a hollow space, a bottom-stand for fixing the induction probe is disposed on the PCB circuit board, a hemispherical lens is disposed on the bottom-stand, a locating ring is sleeved on the bottom-stand, the face-cover and the face-plate have a through hole, respectively, the lens protrudes through the face-cover and face-plate, a locating sleeve is disposed at the face-plate, the locating sleeve surrounds the lens, one end of the locating sleeve passes through the face-plate and the face-cover to connect with screw threads of the locating ring.

3. The multifunctional LED induction lamp according to claim 2, wherein the recharge stand comprises a bottom-cover and a face-piece, the plug pieces are disposed on the bottom-cover, the face-piece has an edge at the peripheral, the edge coats the periphery of the lamp body, a fastener is disposed at the edge, the lamp body is connected with the recharge stand via the fastener, an iron block is fixed in the face-piece of the shell body via 3M glue, and a magnet is fixed to the face-piece of the recharge stand.

4. The multifunctional LED induction lamp according to claim 1, wherein the face-piece of the shell body has a kidney groove and a circular hole at the side-face, the snap switch is disposed on the PCB circuit board and passes through the kidney groove, the snap switch is sleeved by a limiting part, a kidney part connected with the snap switch is disposed at the kidney groove, the kidney part moves upwards and downwards in the kidney groove to turn on or off the snap switch, a switch sleeve is disposed at the circular hole, and the switch sleeve is connected with the button switch.

\* \* \* \* \*